United States Patent [19]
Ichiyoshi

[11] Patent Number: 5,526,348
[45] Date of Patent: Jun. 11, 1996

[54] AREA RADIO COMMUNICATION WITH RADIO CHANNELS DIVIDED INTO CHANNEL GROUPS

[75] Inventor: Osamu Ichiyoshi, Tokyo, Japan

[73] Assignee: NEC Corporation, Tokyo, Japan

[21] Appl. No.: 310,080

[22] Filed: Sep. 22, 1994

[30] Foreign Application Priority Data

Sep. 24, 1993 [JP] Japan .................................. 5-237529

[51] Int. Cl.⁶ ..................................................... H04B 7/208
[52] U.S. Cl. ............................ 370/57; 370/70; 455/34.1; 455/56.1
[58] Field of Search ................................. 455/34.1, 34.2, 455/54.2, 56.1, 57.1; 370/37, 38, 57, 69.1, 70, 120, 121, 123

[56] References Cited

U.S. PATENT DOCUMENTS

| | | | |
|---|---|---|---|
| 3,623,105 | 11/1971 | Kamen et al. | 370/69.1 |
| 4,211,894 | 7/1980 | Watanabe et al. | 370/57 |
| 5,363,428 | 11/1994 | Nagashima | 455/34.1 |

FOREIGN PATENT DOCUMENTS 60-62739  4/1985  Japan .

OTHER PUBLICATIONS

"Mobile Communication System Handbook", 1989—Electromagnetic Wave System Development Center of Japan. pp. 6 and 7.

Fumio Tamita et al "PSK Group Modem and its Performance", *IEEE Globecom*, 1986, pp. 1696–1702.

*Primary Examiner*—Benedict V. Safourek
*Attorney, Agent, or Firm*—Sughrue, Mion, Zinn, Macpeak & Seas

[57] ABSTRACT

To establish radio channels according to a DAMA scheme, FDM radio channels are divided into channel groups, each containing a predetermined number of neighboring channels. The base station includes group modems for FDM modem processing, on a basis of each channel group, into uplink baseband signals uplink radio signals received from source stations in uplink channel groups and downlink baseband signals into downlink radio signals sent to destination stations in downlink channel groups and a switching unit for switching the baseband signals from the uplink channel groups into the downlink channel groups according to the destination stations. Each terminal station includes a group modem for FDM modem processing en-bloc downlink channel group radio signals into downlink terminal baseband signals and uplink terminal baseband signals into uplink channel group radio signals and baseband processors for processing the downlink terminal baseband signals for supply to the communication terminals according to the neighboring channels of the downlink channel group and uplink baseband signals of the communication terminals into the uplink terminal baseband signals according to the neighboring channels of the uplink channel group.

25 Claims, 7 Drawing Sheets

AREA RADIO COMMUNICATION WITH RADIO CHANNELS DIVIDED INTO CHANNEL GROUPS

BACKGROUND OF THE INVENTION

This invention relates to area radio communication which is capable of readily establishing radio channels where no communication networks are available. The radio communication channels are established via a base station having a communication or service area between first and second stations of a plurality of terminal stations present in the communication area. More particularly, this invention relates to an area radio communication method, an area radio communication network, a base station of the area radio communication network, and to each terminal station of the area radio communication network.

The area radio communication is implemented, for example, by a satellite communication network. It is possible by the satellite communication network to cover a wide communication area on the earth's surface by installing terrestrial stations in the communication area. In such a satellite communication network, it is advantageous for raise of an antenna gain and for the possibility of frequency reuse to make a transponder emit spot beams to the terrestrial stations. It is advantageous on the other hand for compactness of each terrestrial station to establish the radio communication channels in accordance with a frequency division multiple access (FDMA) technique.

In the manner which will later be described in greater detail, a satellite station is disclosed for use as a transponder in Japanese Patent Prepublication (A) No. 62,739 of 1985. From the terrestrial stations working as source stations, N uplink radio signals are directed to the satellite station as frequency division multiplex (FDM) radio signals, where N represents a predetermined natural number, such as ten. In order to switch the N uplink radio signals into N downlink radio signals transmitted as the spot beams to the terrestrial stations operable as destination stations, the satellite station comprises a frequency division multiplex switching or exchange arrangement comprising $N^2$ switching elements.

This satellite station is capable of switching the uplink radio signal from an arbitrary one of the source stations to the downlink radio signal directed to a desired one of the destination stations with advantages of the spot beams kept to raise the antenna gain and to raise a channel capacity by use of the frequency reuse. The satellite station is, however, bulky and complicated because the $N^2$ switching elements are indispensable, each switching element comprising a variable frequency bandpass filter and a variable frequency converter. Moreover, each variable frequency bandpass filter must deal with a frequency band into which an entire radio frequency range of the satellite communication network is divided on an average by N and which is a considerably wide passband. In order to insure a sufficient attenuation out of the passband, a guard frequency band is necessary in proportion to the passband and reduces an efficiency of frequency utilization to, for example, only 50 percent.

Prior to publication of the above-referenced Japanese patent prepublication, a multichannel access (MCA) system was standardized 1982 in Japan and is described in various publications, for example, in (in translation) "Mobile Communication System Handbook" published 1989 by the Electromagnetic Wave System Development Center of Japan. In the manner which will later be described more in detail, the MCA system comprises a terrestrial center station having a communication or service area, a plurality of terrestrial commanding or directive stations in the communication area with each commanding station assigned with a local service area, and at least one mobile station movable in the local service area. The center station transmits and receives radio signals to and from the commanding stations by a center station antenna having no directivity. The center station deals with communication between each commanding station and the mobile stations and between the mobile stations by using a single control channel to automatically select an idle channel of communication channel.

Being given no directivity, the center station antenna has a poor antenna gain and must be fed with an appreciably high radio frequency power. This imposes a restriction on a breadth of the communication area.

SUMMARY OF THE INVENTION

It is consequently an object of the present invention to implement area radio communication for which a base station is compact.

It is another object of this invention to implement area radio communication which is of the type described and in which the base station is simple in structure.

It is still another object of this invention to implement area radio communication which is of the type described and which has a high frequency utilization efficiency.

It is yet another object of this invention to implement area radio communication which is of the type described and which need not an appreciable guard frequency band between a pair of adjacent frequency bands used in the area radio communication.

It is a further object of this invention to implement area radio communication which is of the type described and in which the base station need not high radio frequency power to feed its antenna.

It is a still further object of this invention to implement area radio communication which is of the type described and in which the base station is accompanied by an antenna of a high gain.

It is a yet further object of this invention to implement area radio communication which is of the type described and in which the base station is inexpensive.

Other objects of this invention will become clear as the description proceeds.

In accordance with a general aspect of this invention, there is provided area radio communication of establishing radio communication channels via a base station having a communication area between first and second stations of a plurality of terrestrial stations present in the communication area through idle channels selected from a plurality of radio channels of a frequency division multiplex system in response to each call according to a demanded assign access scheme.

Broadly speaking, there is provided according to the general aspect of this invention area radio communication which is set forth above and in which the radio channels are divided into a plurality of channel groups, each comprising a predetermined number of neighboring channels of the radio channels.

In accordance with a specific aspect of this invention, there is provided an area radio communication method which is for the above-recited area radio communication and comprises the step of processing for establishment of the radio communication channels the neighboring channels on a basis of each of the channel groups.

In accordance with another specific aspect of this invention, there is provided an area radio communication network which is for the above-recited area radio communication and comprises, in the base station, processing means for processing to establish the radio communication channels the neighboring channels on a basis of each of the channel groups.

In accordance with still another specific aspect of this invention, there is provided a base station which is for use in an area radio communication network comprising a plurality of terminal stations in a communication area of the base station in establishing the above-recited radio communication channels with the radio communication signals divided in the above-recited manner and which comprises processing means for processing to establish the radio communication channels the neighboring channels on a basis of each of the channel groups.

In accordance with yet another specific object of this invention, there is provided a terminal station used as a first station in addition to a plurality of other terminals stations an area radio communication network which comprises a base station having a communication area and the first station and the above-mentioned other stations in the communication area and which establishes the above-recited radio communication channels with the radio channels divided in the above-recited manner, wherein each terminal station of the first station and the above-mentioned other terminal stations comprises processing means for processing to establish the radio communication channels the neighboring channels on a basis of each of the channel groups.

DESCRIPTION OF THE PREFERRED EMBODIMENT

Figure 1:
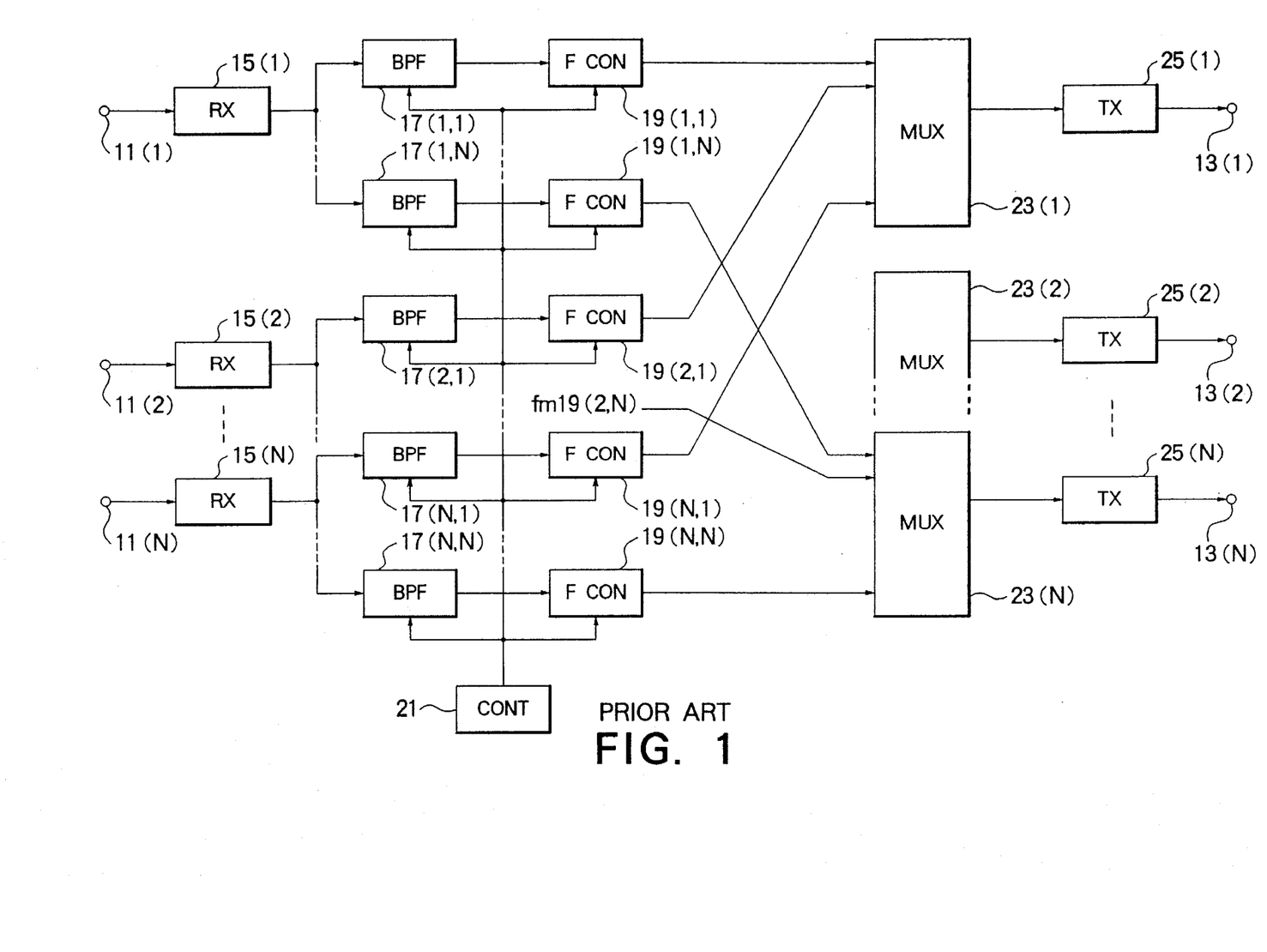
FIG. 1 is a block diagram of a conventional base station.

Referring to FIG. 1, a conventional base station will first be described in order to facilitate an understanding of the present invention. This base station is a satellite station mentioned heretobefore and revealed in the above-referenced Japanese patent prepublication.

In FIG. 1, the satellite station has first through N-th station input terminals 11(1) to 11(N) and first through N-th station output terminals 13(1) to 13(N), where N represents a predetermined natural number which may typically equal to ten. The input and the output terminals will either singly or collectively be designated by single reference numerals 11 and 13 with omission of the suffixes enclosed with the parentheses. Similar manners of designation will be used throughout the description which follows.

The input terminals 11 are supplied with first through N-th uplink signals directed to the satellite station. The uplink signals are single carrier per channel (SCPC) multiplexed radio frequency reception signals of a 6-GHz band. First through N-th receivers 15(1) to 15(N) or 15 are for amplifying and frequency converting the uplink signals to first through N-th primarily frequency converted signals of a 400-MHz band. In the manner which will be described in the following, first through N-th frequency division multiplex (FDM) switching or exchange arrangements are connected to the first through the N-th receivers 15, respectively.

Connected to an n-th receiver 15(n), where n is variable between 1 and N, both inclusive, an n-th frequency division switching arrangement comprises n-th-group first through N-th variable bandpass filters (BPF) 17(n, 1) to 17(n, N) or 17, which are connected to n-th-group first through N-th variable frequency converters (F CON) 19(n, 1) to 19(n, N) or 19. Controlled in common by a frequency division and frequency conversion controller (CONT) 21, the bandpass filters 17 and the frequency converters 19 of the first through the N-th frequency division multiplex switching arrangements produce first-group through N-th-group first through N-th secondarily frequency converted signals of, for example, a 800-MHz band.

Among first through N-th multiplexers (MUX) 23(1) to 23(N) or 23, an n-th multiplexer 23(n) frequency division multiplexes n-th-group first through N-th secondarily frequency converted signals supplied from the n-th-group first through N-th frequency converters 19. In this manner, the first through the N-th multiplexers 23 deliver first through N-th frequency division multiplexed signals to first through N-th transmitters 25(1) to 25(n) or 25, which supply the station output terminals 13 with single carrier per channel multiplexed radio frequency transmission signals of a 4-GHz band as first through N-th downlink signals. It is clear that the satellite station has merits and demerits described hereinabove.

Figure 2:
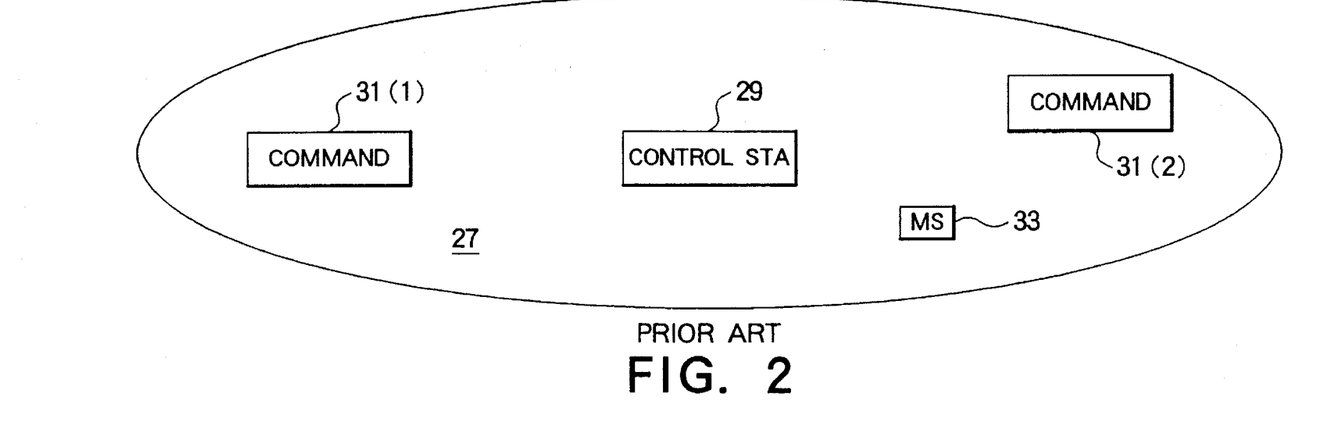
FIG. 2 is a schematic perspective view of a conventional area radio communication network.

Turning to FIG. 2, a conventional area radio communication network is the multichannel access (MCA) system referred to heretobefore and covers a communication or service area 27 of a radius which may be between 20 and 30 km. Use is made of radio frequency signals of a 800-MHz band.

A terrestrial control or center station 29 is placed near a center of the communication area 27 and is accompanied by a center station antenna having no directivity. In the communication area 27, plurality of terrestrial commanding or directive stations 31(n) are disposed, each for radio communication with the control station 29 and with a plurality of mobile stations (MS). In the example being illustrated, only first and second commanding stations (COMMAND) are depicted at 31(1) and 31(2) or 31 each having a local service area with one of the mobile stations exemplified at 33 in the local service area of the second commanding station 31.

Nearly four hundred bands are used in the 800-MHz band for assignment to up to this number of multichannel access systems. In each of the nearly four hundred bands, the control station 29 uses a single control channel and four to fifteen communication channels depending on the number of mobile stations 33 and uses the control channel in automatically selecting an idle one of the communication channels in response to a call for communication between each commanding station 31 and the mobile stations 33 in its local service area and between the mobile stations 33 through at least two of the commanding stations 31 when the mobile stations 33 are present in different local service areas. Mainly due to no directivity of the center station antenna, the multichannel access system is defective as described hereinabove.

Figure 3:
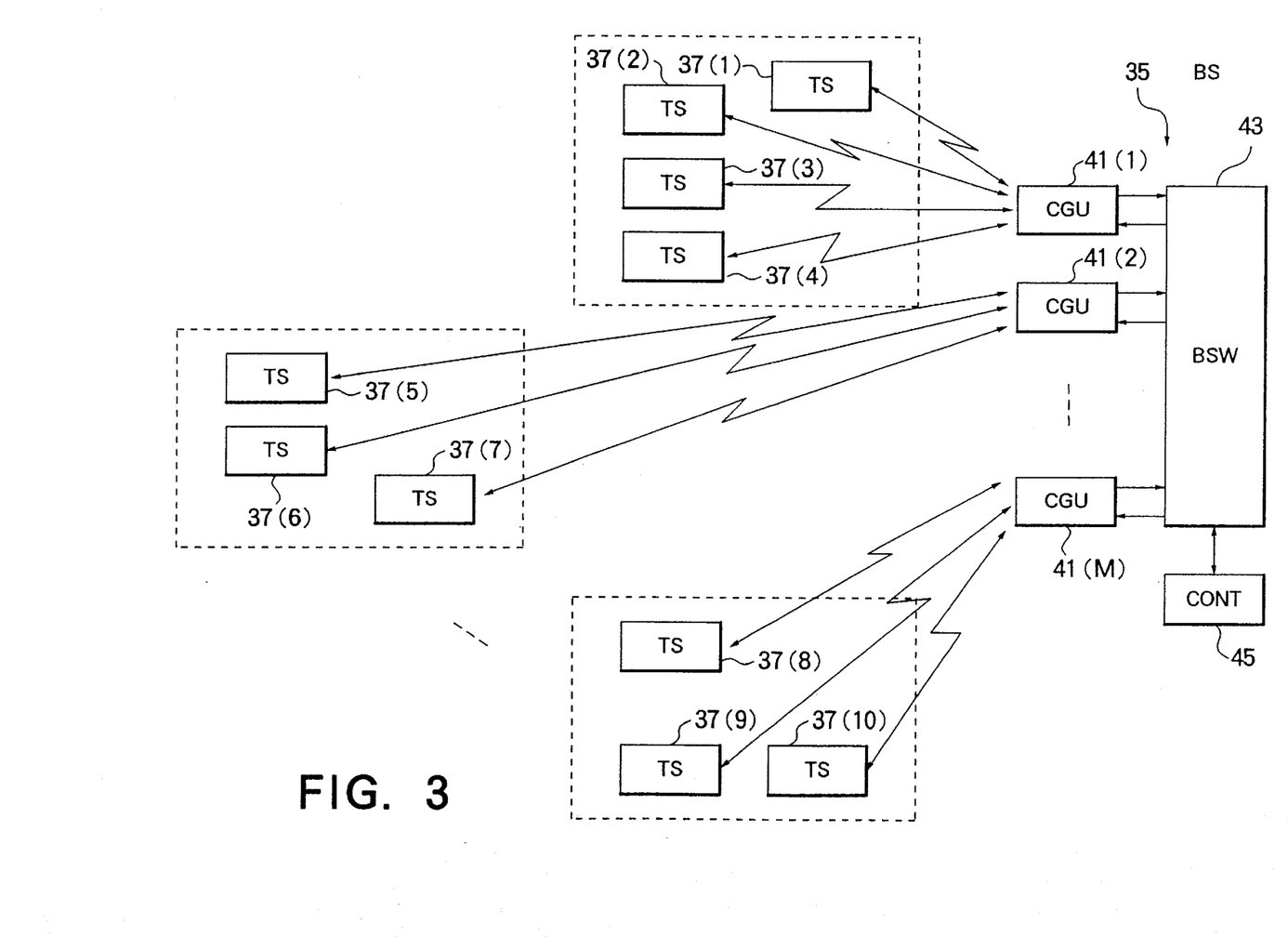
FIG. 3 is a block diagram of an area radio communication network according to an embodiment of the instant invention.
Figure 5:
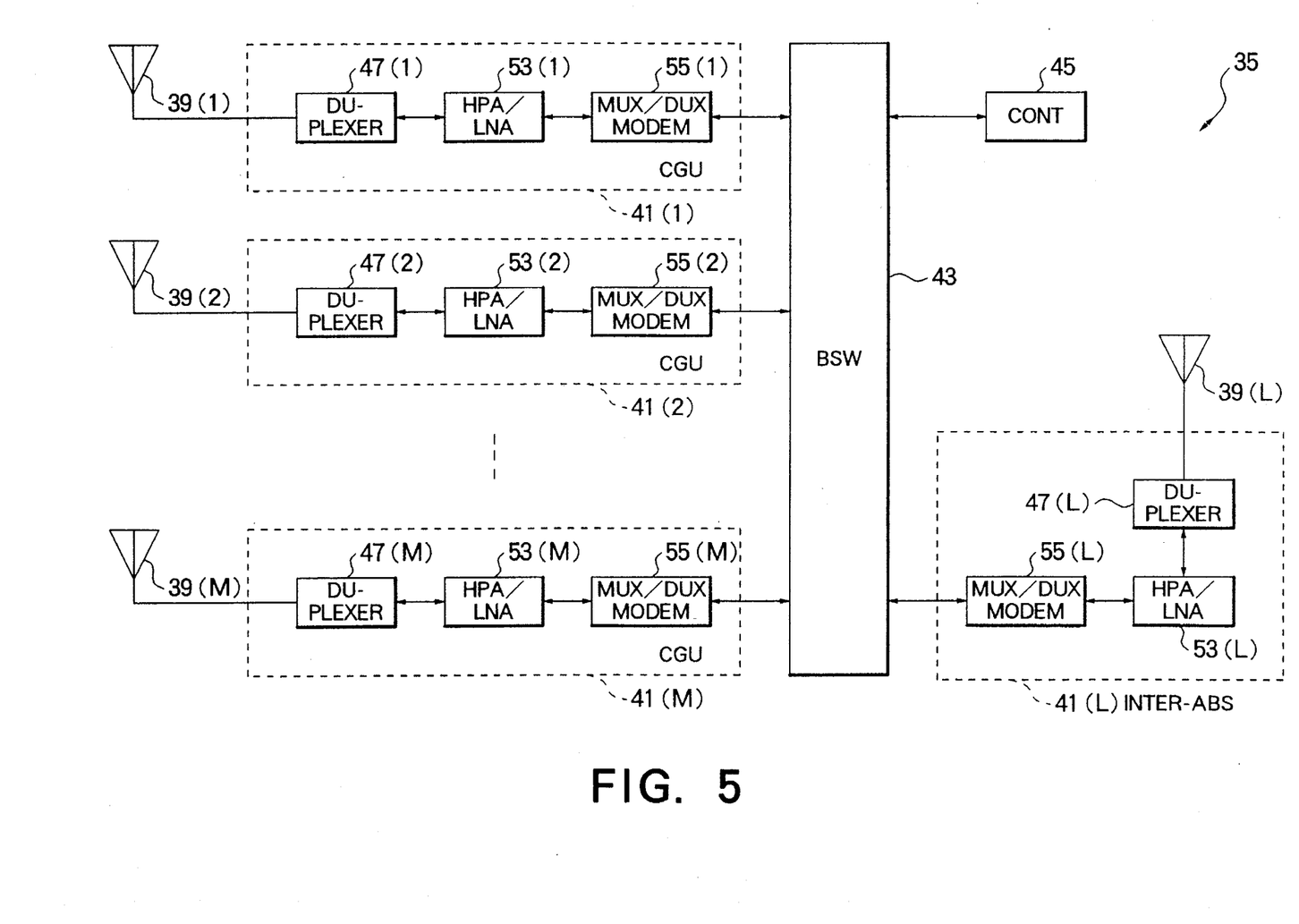
FIG. 5 is a block diagram of a base station of the area radio communication network depicted in FIG. 3.

Referring now to FIG. 3 and 5, the description will proceed to an area radio communication network according to a preferred embodiment of this invention. The network covers a communication or service area which corresponds to the communication area 27 described in conjunction with FIG. 2 and is wider in general than the communication area 27.

In order to establish radio communication channels for telephone and/or data signals in such a wide communication area, a base station (BS) 35 is installed nearly centrally of this communication area. In the illustrated example, a multiplicity of terminal stations (TS), such as first through tenth terrestrial stations 37(1), 37(2), . . . , and 37(10) or 37, are placed in the communication area and are grouped into a plurality of local station groups, equal in number to a relatively small integer M, such as ten. Each station group may comprise a relatively great number of terminal stations 37, such as fifty to one hundred and thirty terminal stations.

Merely for convenience of the description, two of the terminal stations 37 are herein called first and second stations and will be designated by 37(A) and 37(B), where A and B are used as suffixes to indicate one and another of 1 through 10. The first and the second stations 37 may be included in one of the station groups. Alternatively, the first and the second stations 37 may be included in different station groups.

Like the terrestrial control station 29 described in connection with FIG. 2, the base station 35 deals with communication between the first and the second stations 37 by selecting idle channels from a plurality of radio channels of a frequency division multiplex system responsive to each call in accordance with a demanded assign multiple access (DAMA) scheme or technique. The base station 35 is accompanied by first through M-th base station antennas 39(1) to 39(M) or 39 having their respective directivities to emit downward or downlink radio signals to destination stations of the terminal stations 37 in the first to the M-th station groups, respectively, and to receive upward or uplink radio signals from source stations of the terminal station 37 of the first to the M-th station groups, respectively.

The first and the second stations 37 are one of the source stations and one of the destination stations at a time and one of the destination stations and one of the source stations at a different time. In any event, the communication area of the network is used in a direction division fashion. This renders it sufficient to feed the base station antennas 39 with a low radio frequency power, such as only 1 W in contrast to the appreciably high radio frequency power, such as 100 W, used in feeding the center station antenna in the multichannel access system illustrated with reference to FIG. 2. The communication area is accordingly wider in the network than in the multichannel access system.

Figure 4:
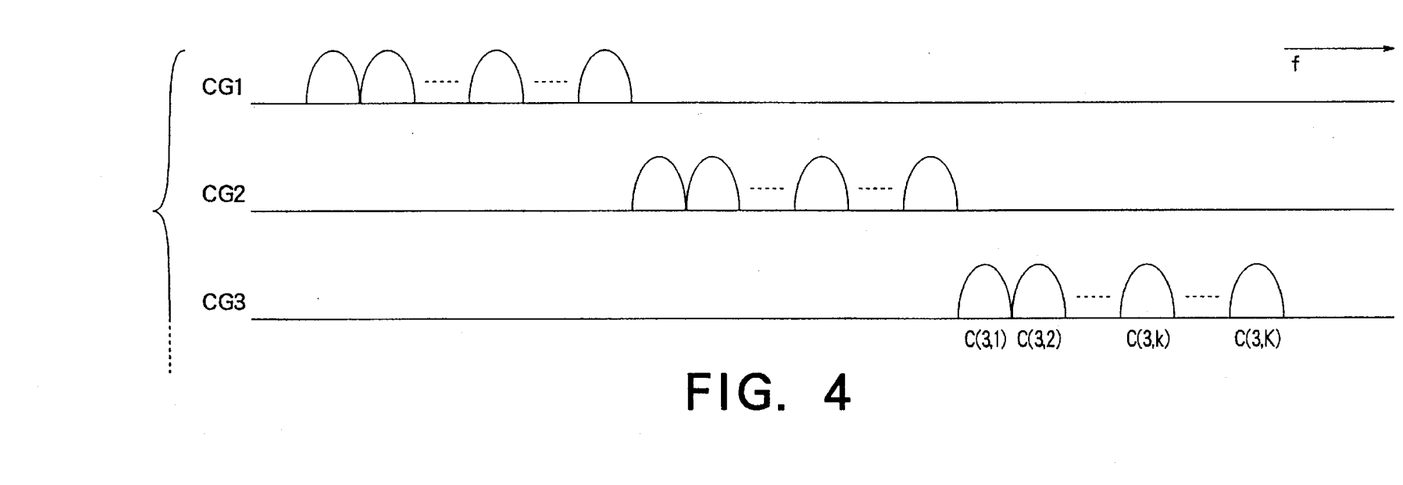
FIG. 4 schematically shows a frequency chart of a plurality of channel groups of radio channels used in the area radio communication network illustrated in FIG. 3.

Turning to FIG. 4 during a short while, frequency division multiplexed radio channels of the downlink or the uplink radio signals are divided into channel group CG in one-to-one correspondence to the station groups. Among first through M-th channel groups, only first to third channel groups CG1, CG2, and CG3 are depicted with their frequency f scaled horizontally at the top.

Each channel group comprises first through K-th neighboring channels, such as c(3, 1), c(3, 2), . . . , c(3, k), . . . , and c(3, K) labelled in connection with the third channel group CG3 alone, where K preferably represents a predetermined natural number, such as one of five to thirteen, k being variable between one and K, both inclusive. Each of the neighboring channels has a preferably predetermined channel width $\Delta f$, such as between 10 kHz and 50 kHz. Each channel group consequently has a channel group width which is equal to a product of the predetermined natural number and the channel width.

In FIG. 3, the number of terminal stations 37 in each station group is typically up to ten times the predetermined natural number. In FIG. 4, the channel group widths of the first to the M-th channel groups are located in a radio frequency band assigned to the uplink or the downlink radio signals so as not to overlap on one another. No guard frequency bands are necessary between two consecutively numbered channel groups and between two consecutive ones of the neighboring channels.

Turning back to FIG. 3, the base station 35 comprises first through M-th channel group units (CGU) 41(1) to 41(M) or 41 in one-to-one correspondence to the station groups and consequently to the channel groups. Through the base station antennas 39, the uplink radio signals of the first to the M-th channel groups are delivered to the first through the M-th channel group units 41. In the manner which will presently be described, the first to the M-th channel group units 41 process the uplink radio signals of the first to the M-th channel groups into uplink baseband signals of the first to the M-th channel groups for delivery to a baseband switching or exchange unit (BSW) 43. The uplink radio signals are processed into the uplink baseband signals channel group by channel group, namely, with no change in the channel groups. In other words, each channel group unit 41 processes the uplink radio signals into the uplink baseband signals on a basis of the corresponding one of the channel groups.

Controlled by a switch control unit 45, the baseband switching unit 43 switches the uplink baseband signals of the first to the M-th channel groups into downlink baseband signals of the first to the M-th channel groups according to the demanded assign multiple access scheme. The control unit 45 makes the baseband switching unit 43 switch the first to the M-th channel groups of the uplink baseband signals into the first to the M-th channel groups of the downlink baseband signals in accordance with the destination stations indicated at the source stations.

It is now understood that the baseband switching unit 43 is readily implemented by a time division switch. This is astonishingly simpler than a combination of $N^2$ switching elements, 17 and 19, described in conjunction with FIG. 1.

From the baseband switching unit 43, the downlink baseband signals of the first to the M-th channel groups are delivered to the first through the M-th channel group units 41 with correspondence kept between the channel groups and the channel group units 41. The first to the M-th channel group units 41 process the downlink baseband signals of the corresponding channel groups into the downlink radio signals of the corresponding channel groups for feed of the base station antennas 39. As a consequence, it is possible to understand the first to the M-th channel group units 41 as first to M-th modem units.

Figure 6:
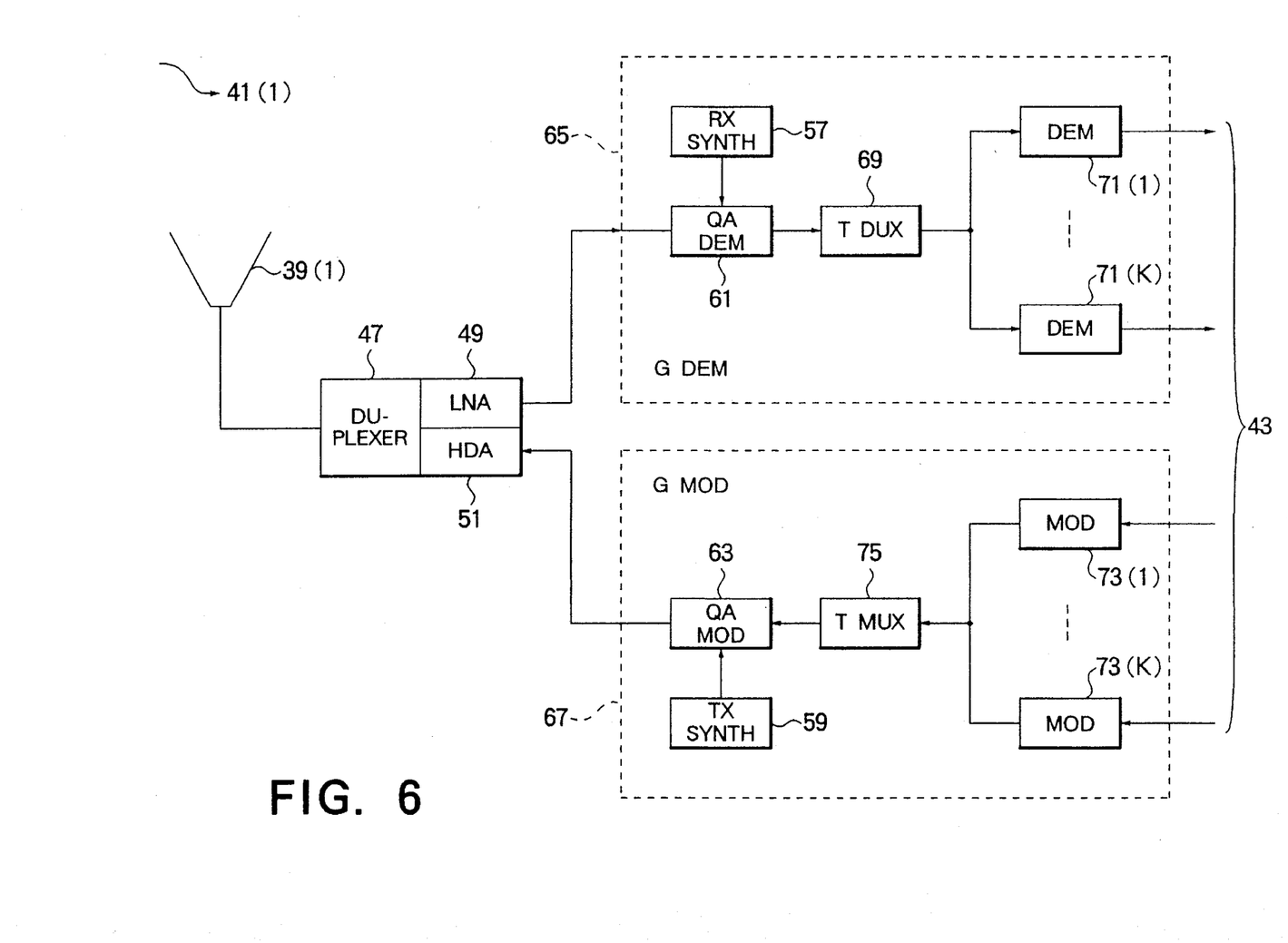
FIG. 6 shows in blocks one of channel group units used in the base station shown in FIG. 5 together with a baseband switching arrangement.

Referring to FIGS. 5 and 6, the first channel group unit or the first modem unit 41(1) is depicted in FIG. 6 as a representative of the first to the M-th channel group units 41 illustrated in FIG. 5. In FIG. 6, the channel group unit 41(1) comprises a duplexer 47 connected to the base station antenna 39(1) for the first modem unit 41(1). A connection between the base station antenna 39 and the duplexer 47 serves as a receiver unit for receiving the uplink radio signals of a corresponding one of the first to the M-th channel groups to deliver reception radio signals through the duplexer 47 to a low-noise amplifier (LNA) 49, which low-noise amplifies the reception radio signals en-bloc into low-noise amplified signals.

A high-power amplifier (HPA) 51 is supplied with transmission radio signals in the manner which will shortly be described. Supplied from the high-power amplifier 51 with high-power amplified signals into which the transmission radio signals are en-bloc high-power amplified, the connection serves as a transmitter unit for transmitting the high-power amplified signals through the duplexer 47 and the base station antenna 39 as the downlink radio signals of the corresponding one of first to M-th channel groups.

In FIG. 5, first through M-th duplexers 47(1) to 47(M) or 47 are illustrated in the first to the M-th channel group units 41. Similarly depicted are first through M-th amplifier combinations (HPA/LNA) 53(1) to 53(M) or 53, each consisting of the high-power amplifier 51 and the low-noise amplifier 49 described in conjunction with FIG. 6. Connected to the amplifier combinations 53 and in common to the baseband switching unit 43 are first through M-th multiplexer/demultiplexer and modem units (MUX MODEM) 55(1) to 55(M) or 55, each of which frequency division multiplex demodulates the low-noise amplified signals en-bloc into the uplink baseband signals of the corresponding one of first to M-th channel groups and frequency division multiplex modulates the downlink baseband signals of the corresponding one of first to M-th channel groups en-bloc into the transmission radio signals.

In FIG. 5, the baseband switching unit 43 is connected additionally to an inter-area base station (Inter-ABS) link 41(L) which is an equivalent of each channel group unit 41. So as to be operable in the manner which will later be described, the inter-area base station link 41(L) is connected to a link antenna 39(L) and comprises a link duplexer 47(L) connected to the link antenna 39(L), a link amplifier combination (HPA/LNA) 53(L) connected to the link duplexer 47(L), and a link multiplexer/demultiplexer modem unit (MUX MODEM) 55(L) between the link amplifier combination 53(L) and the baseband switching unit 43.

More particularly referring to FIG. 6, it will be assumed that the uplink radio signals of each channel group are quadrature amplitude modulated signals of uplink radio frequencies having the channel group width of the channel group under consideration and that the downlink radio signals of each channel group are quadrature amplitude modulated signals of downlink radio frequencies having the channel group width of the channel group in question. Each multiplexer/demultiplexer and modem unit 55 comprises a reception synthesizer (RX SYNTH) 57 for synthesizing the uplink radio frequencies and a transmission synthesizer (TX SYNTH) 59 for synthesizing the downlink radio frequencies.

Connected to the low-noise amplifier 49 and to the reception synthesizer 57 by a coaxial cable, a quadrature amplitude demodulator (QA DEM) 61 demodulates the low-noise amplified signals into frequency division multiplexed reception signals of the corresponding one of first to M-th channel groups. Connected to the high-power amplifier 51 and to the transmission synthesizer 59 through another coaxial cable, a quadrature amplitude modulator (QA MOD) 63 modulates frequency division multiplexed transmission signals of the corresponding one of first to M-th channel groups into the transmission radio signals.

Including the quadrature amplitude demodulator 61 as an additional component and connected to the low-noise amplifier 49, a base station group demodulator unit (G DEM) 65 frequency division multiplex demodulates the low-noise amplified signals en-bloc into the uplink baseband signals of the channel group under consideration for supply to the baseband switching unit 43. Including the quadrature amplitude modulator 63 and connected to the baseband switching unit 43, a base station group modulator unit (G MOD) 67 frequency division multiplex modulates the downlink baseband signals of the corresponding one of first to M-th channel groups en-bloc into the transmission radio signals of the channel group in question for delivery to the high-power amplifier 51.

The group modulator unit 67 and the group demodulator unit 65 collectively serve as a group modem unit. Such a group modem unit is described in an article contributed by Fumio Tomita, Osamu Ichiyoshi, the present inventor, and Kazuo Yano to the IEEE Globecom., 1986, pages 1696 to 1702, under the title of "PSK Group Modem and its Performance".

In FIG. 6, the group modulator unit 65 comprises a transdemultiplexer (T DUX) 69 connected to the low-noise amplifier 49 in practice through the quadrature amplitude demodulator 61. As will be understood from the above-mentioned Tomita et al article, the transdemultiplexer 69 is implemented by a fast Fourier transform and a digital filter unit on a more compact scale than use of individual filters and frequency division demultiplexes the low-noise amplified signals of the channel group of the corresponding one of first to M-th channel groups into uplink reception signals according to the channel group under consideration.

First through K-th individual demodulators 71(1) to 71(K) or 71 demodulate the uplink reception signals into the uplink baseband signals of the first to the K-th neighboring channels of the channel group in question. These uplink baseband signals are delivered to the baseband switching unit 43.

Connected to the baseband switching unit 43, first through K-th individual modulators (MOD) 73(1) to 73(K) or 73 modulate the downlink baseband signals of the first to the K-th neighboring channels of the corresponding one of first to M-th channels collectively into downlink transmission signals of the channel group in question. Like the transdemultiplexer 69, a transmultiplexer (T MUX) 75 frequency division multiplexes the downlink transmission signals en-bloc into the transmission radio signals of the channel group in question for supply in practice through the quadrature amplitude modulator 63 to the high-power amplifier.

Reviewing FIGS. 5 and 6, it is clear that output signals of the group demodulator units, such as 65, of the first to the M-th channel group units 41 are switched by the baseband switching unit 43 for supply to the group modulator units, as 75, of the first to the M-th channel group units 41 depending on the station group to which the destination stations belong. The base station 35 is operable in this manner in a detection and relay fashion. This suppresses accumulation of noise during transmission of the uplink radio signals from the source stations and of the downlink radio signals to the destination stations to insure excellent performance of the area radio communication network.

Figure 7:
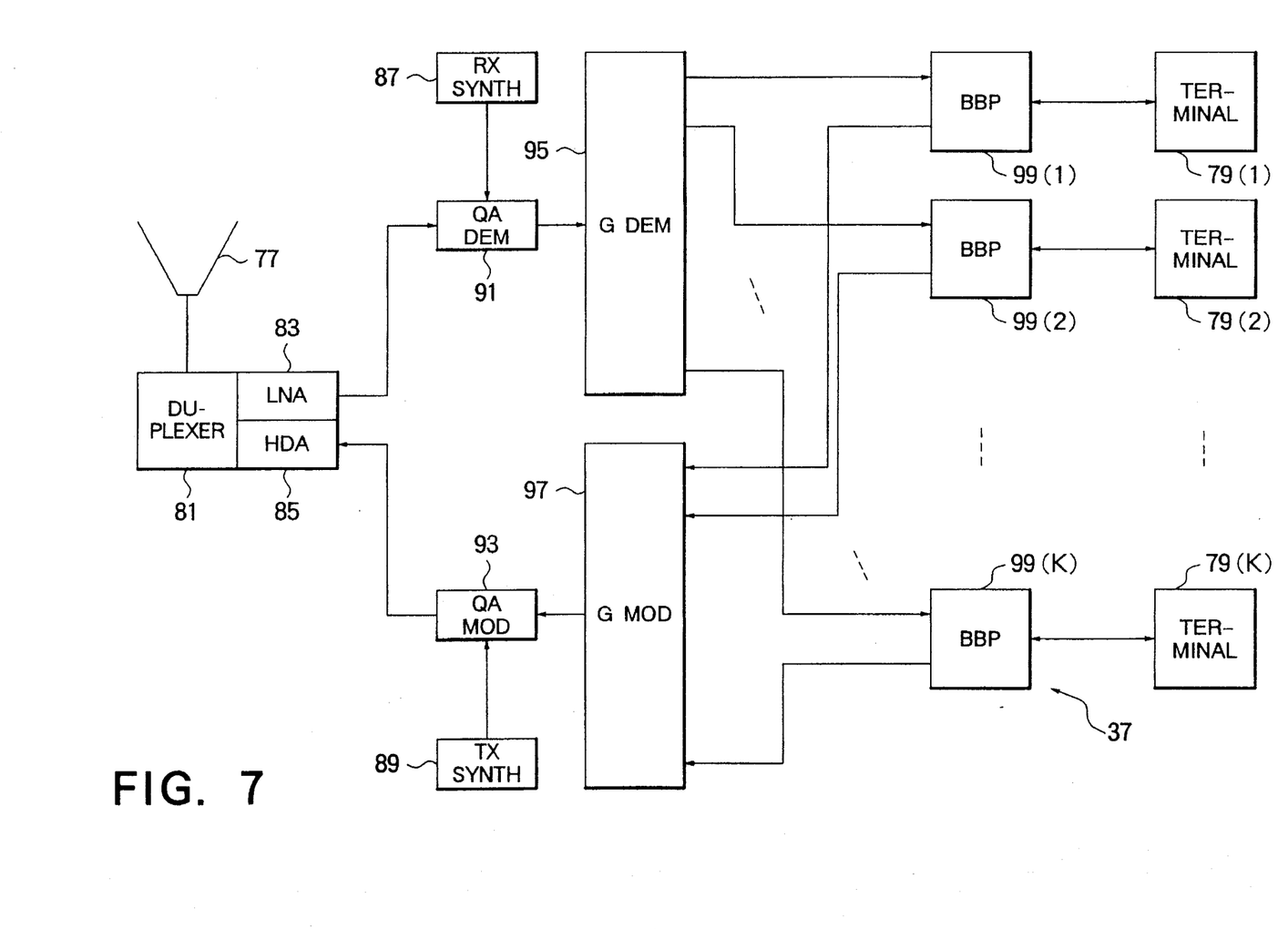
FIG. 7 is a block diagram of one of terminal stations used in the area radio communication network depicted in FIG. 3.

Referring afresh to FIG. 7, each terminal station 37 is in one of the station groups that may be called a particular station group. The terminal station 37 is accompanied by a terminal station antenna 77 and by first through K-th communication terminals (TERMINAL) 79(1), 79(2), . . . , and 79(K) or 79. The antenna 77 is for transmitting the uplink radio signals and for receiving the downlink radio signals, the uplink and the downlink radio signals being of ones of the channel groups that correspond to the particular station group as a particular uplink and a particular downlink channel group. The communication terminals 79 may be less in number than K.

In the manner described in conjunction with FIG. 6, a duplexer 81 is connected to the antenna 77. A low-noise amplifier 83 and a high-power amplifier 85 are connected to the duplexer 81. A reception synthesizer (RX SYNTH) 87 generates downlink radio frequencies of the particular downlink channel group. A transmission synthesizer (TX SYNTH) 89 generates uplink radio frequencies of the particular uplink channel group. A quadrature amplitude demodulator (QA DEM) 91 is connected to the low-noise amplifier 83 and to the transmission synthesizer 89. A quadrature amplitude modulator (QA MOD) 93 is connected to the high-power amplifier 85 and to the transmission synthesizer 89.

Corresponding to the group demodulator 65 described in connection with FIG. 6, a terminal station group demodulator (G DEM) 95 is connected in practice to the quadrature amplitude demodulator 91 and frequency division demodulates in effect the downlink radio signal of the particular downlink channel group into downlink baseband signals of the particular downlink channel group. Similarly, a terminal station group modulator (G MOD) 97 is connected in practice to the quadrature amplitude modulator 93 and frequency division modulates in effect, into the uplink radio signals of the particular uplink channel group, uplink baseband signals of the particular uplink channel group.

In place of the baseband switching unit 43 described primarily in conjunction with FIG. 5, a baseband processing unit is connected to the group demodulator 95 and the group modulator 97. The baseband processing unit consists of first through K-th baseband processors (BBP) 99(1), 99(2), . . . , and 99(K) or 99 connected to the first to the K-th communication terminals 79. Each baseband processor 99 is, for example, a voice codec.

For delivery to the communication terminals 79, the baseband processors 99 process the downlink baseband signals into first through K-th decoded signals, such as voice and/or data signals, according to the first to the K-th neighboring channels of the particular downlink channel group. Supplied from the communication terminals, originating signals, such as voice and/or data signals, are encoded by the baseband processors 99 into the uplink baseband signals of the particular uplink channel group in accordance with its first to K-th neighboring channels for supply to the group demodulator 97.

As will readily be understood, it is possible to modify each terminal station 37 so as to deal with only one of the neighboring channels of the uplink or of the downlink channels that is herein referred to as a particular channel. In such an event, the terminal station 37 is a selectively called station and comprises only one communication network 79.

A demodulator and a modulator for the particular channel should be used in place of the group demodulator 95 and the group modulator 97. The selectively called station may be either a portable telephone unit or a usual cellular mobile station and inexpensively provides the terminal station 37.

Figure 8:
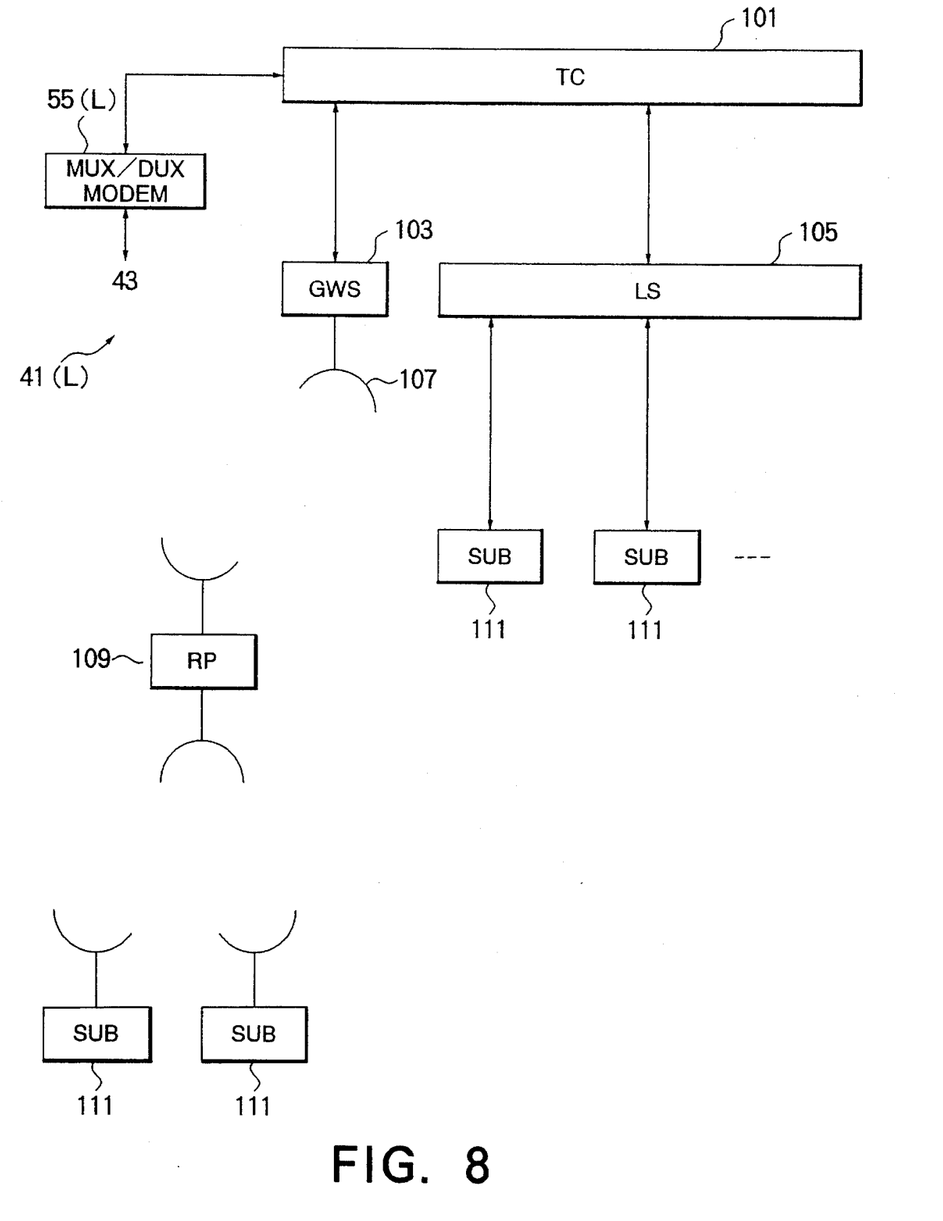
FIG. 8 is a block diagram illustrative of an application to a telecommunication network of the area radio communication network illustrated in FIG. 3.

Referring to FIG. 8, the inter-area base station link 41(L) enables the base station 35 to serve as an end office of a telecommunication network which may extend outwardly of the communication area of the area radio communication network. It will be assumed merely for brevity of the description that the telecommunication network is a wired communication network.

In this event, a toll center (TC) 101 of the telecommunication network is connected to the link multiplexer/demultiplexer modem 55(L) through a coaxial cable in place of the link antenna 39(L), the link duplexer 47(L), and the link amplifier combination 53(L) described in conjunction with FIG. 5. The telecommunication network may comprise a gateway station (GWS) 103 connected to the toll center 101 and a local switch (LS) 105 connected to the toll center 101 through a plurality of four-wire lines which are depicted by a single line. The gateway station 103 is accompanied by a gateway station antenna 107 to establish a radio link to and from a repeater station (RP) 109.

The telecommunication network comprises a plurality of subscriber units (SUB) 111. Some of the subscriber units 111 are connected to the local switch 105. Others of the subscriber units 111 may be covered by the repeater station 109. At any rate, the subscriber units are grouped into a station group which is similar to each of the first through the M-th station groups described before. The inter-area base station link 41(L) is therefore assigned with a channel group which may either be within or outside of the radio frequency band allotted to the area radio communication network.

In the manner understood from FIG. 7, each subscriber unit 101 comprises a communication terminal for a baseband communication signal. When the baseband communication signal originates at the subscriber unit, as an upward baseband signal, a baseband processor produces an encoded signal. Serving in place of the group modulator 97 described in connection with FIG. 7, a modulator produces a unit upward radio frequency signal in one of the first through the K-th neighboring channels of the channel group assigned to the subscriber unit that is selected in accordance with the demanded assign multiplex access scheme.

The unit upward radio frequency signal is delivered to the local switch 105 and thence to the toll center 101. Alternatively, the unit upward radio frequency signal is transmitted to the repeater station 109 and thence to the toll center 101 through the gateway station 103. The toll center 101 frequency division multiplexes the unit upward radio frequency signal and like unit upward radio frequency signals either directly or through the quadrature amplitude modulator 93 of FIG. 7 into an upward group radio frequency signal for delivery to the link multiplexer/demultiplexer modem 55(L).

When a downward group radio frequency signal is produced by the link multiplexer/demultiplexer modem 55(L) in the channel group under consideration, the toll center 101 and the local switch 105 or a combination of the gateway and the repeater stations 103 and 109 make the subscriber units 111 produce the decoded signals as described before.

In FIG. 8, the local switch 105 or the repeater station 109 may process the unit upward radio frequency signals of relevant ones of the subscriber units 111 into the upward group radio frequency signal and the downward group radio frequency signal into unit downward radio frequency signals for the subscriber units 111 covered thereby. The subscriber units 111 may be grouped into two or more station groups with the terminal stations 37 of FIG. 3 grouped into an accordingly less number of station groups if the telecommunication network is a radio communication network assigned with the radio frequency band in at least partly common to the area radio communication network. Even in such an event, the toll center 101 can process the unit upward radio frequency signals and the downward group radio frequency signal or signals.

Even assigned with such functions, the local switch 103 and like switches of the telecommunication network are simpler in structure than a usual and expensive local switch. Comprising the baseband switching unit 43 and the switch control unit 45 described in conjunction with FIGS. 3 and 5, the base station 35 serves as a radio local switch which is as simple in structure as the local switch 105 of FIG. 8. Incidentally, it is possible to use known protocols, such as those defined by the AMPS (advanced mobile phone service) standard, in dealing with the downlink and the uplink radio signals and the upward and the downward group radio frequency signals.

It is possible to use the base station 35 as a radio local switch, such as 105, to deal with communication among the terminal stations 37 together with charging processings. In this event, the inter-area base station link 41(L) may be connected to a plurality of toll switches (TS), each of which is installed in the toll center 101 in FIG. 8.

Alternatively, it is possible to use the base station 35 as a radio private branch exchange. In this instance, the inter-area base station link 41(L) is connected to a local switch, such as 105, and processes calls from the local switch to the selectively called stations either in a dial-in fashion or as extensions. The inter-area base station link 41(L) may furthermore be connected to a plurality of toll switches.

As a further alternative, the base station 35 is used as a radio concentrator. The inter-area base station link 41(L) is directly connected to the local switch and furthermore to a plurality of toll switches. This connection is not different from that used in the radio private branch exchange. Operation is, however, different in the manner known in the art.

While this invention has thus far been described in specific conjunction with only one embodiment thereof, it will now be readily possible for one skilled in the art to put this invention into effect in various other manners. For example, it is possible to use one of the neighboring channels of each channel group as a control channel in controlling call origination, response, and channel assignment. The base station 35 may be a satellite station, such as illustrated with reference to FIG. 1. In this event, it is possible to use spot beams for the first through the M-th station groups and for the telecommunication network implemented as a radio communication network. It is furthermore possible to use, in place of the terminal stations, a mobile station movable in the communication area of the base station and also in a service area of the telecommunication network. In such a case, it is preferred to use a repeater station, such as 109, in a cell area of either each station group or into which the service area is divided. It should be noted that such a repeater station should deal with the downlink radio signal and the uplink radio signal of each mobile station or the downward group radio frequency signal and the unit upward radio frequency signal as described in the foregoing depending on the circumstances and should deal with switching between the channel groups in the known manner when the mobile station moves from a cell area to another.

What is claimed is:

1. An area radio communication method of establishing radio communication channels via a base station having a communication area between first and second ones of a plurality of terminal stations present in said communication area through idle channels selected from a plurality of radio channels of a frequency division multiplex system in response to each call according to a demanded assign multiple access scheme, comprising the steps of:

dividing said radio channels into a plurality of channel groups, each of said plurality of channel groups comprising a predetermined number of neighboring channels of said radio channels; and designating each of said channel groups as said radio communication channels for different ones of said terminal stations, respectively.

2. An area radio communication method as claimed in claim 1, wherein said designating step designates as said radio communication channels the neighboring channels of first and second groups of said channel groups.

3. An area radio communication method as claimed in claim 1, wherein at least one of said terminal stations is a source station and at least one of said terminal stations is a destination station, uplink channels of the radio channels of said channel groups transmit uplink radio signals from said source stations to said base station with said first station being one of said source stations at a certain time, downlink channels of the radio channels of said channel groups transmit downlink radio signals from said base station to said destination stations with said second station being one of said destination stations at said certain time, and said designating step is performed in said base station and comprises the steps of:

frequency division multiplex demodulating said uplink radio signals en-bloc into uplink baseband signals;

baseband switching said uplink baseband signals into downlink baseband signals according to said demanded assign multiple access scheme; and frequency division multiplex modulating said downlink baseband signals en-bloc into said downlink radio signals.

4. An area radio communication method as claimed in claim 3, wherein:

said frequency division multiplex demodulating step comprises the steps of:
  receiving said uplink radio signals through a duplexer as reception radio signals;
  low-noise amplifying said reception radio signals en-bloc into low-noise amplified signals; and
  frequency division multiplex demodulating said low-noise amplified signals en-bloc into said downlink baseband signals;

said frequency division multiplex modulating step comprising the steps of:
  frequency division multiplex modulating said downlink baseband signals en-bloc into transmission radio signals;
  high-power amplifying said transmission radio signals en-bloc into high-power amplified signals; and
  transmitting said high-power amplified signals through said duplexer as said downlink radio signals.

5. An area radio communication network comprising a base station having a communication area and a plurality of terminal stations in said communication area for establishing communication channels via said base station between first and second ones of said terminal stations through idle channels selected from a plurality of radio channels of a frequency division multiplex system in response to each call according to a demanded assign multiple access scheme, wherein:

said radio channels are divided into a plurality of channel groups, each of said plurality of channel group comprising a predetermined number of neighboring channels of said radio channels; and said base station comprises means for designating each of said channel groups as said radio communication channels for different ones of said terminal stations, respectively.

6. An area radio communication network as claimed in claim 5, wherein said designating means designates as said radio communication channels the neighboring channels of first and second groups of said channel groups.

7. An area radio communication network as claimed in claim 5, wherein at least one of said terminal stations is a source station and at least one of said terminal stations is a destination station, uplink channels of the radio channels of said channel groups transmit uplink radio signals from said source stations to said base station with said first station being one of said source stations at a certain time, downlink channels of the radio channels of said channel groups transmit downlink radio signals from said base station to destination stations with said second station being one of said destination stations at said certain time, and said designating means comprises:

frequency division multiplex modem means for subjecting each of said channel groups to frequency division multiplex modem processing to demodulate said uplink radio signals en-bloc into uplink baseband signals and to modulate downlink baseband signals en-bloc into said downlink radio signals; and baseband switching means for switching said uplink baseband signals into said downlink baseband signals according to said demanded assign multiple access scheme.

8. An area radio communication network as claimed in claim 7, wherein said frequency division multiplex modem means comprises:

receiver means for receiving said uplink radio signals through a duplexer as reception radio signals;

low-noise amplifier means for low-noise amplifying said reception radio signals en-bloc into low-noise amplified signals;

demodulator means for frequency division multiplex demodulating said low-noise amplified signals en-bloc into said uplink baseband signals;

modulator means for frequency division multiplex modulating said downlink baseband signals en-bloc into transmission radio signals;

high-power amplifier means for high-power amplifying said transmission radio signals en-bloc into high-power amplified signals; and transmitter means for transmitting said high-power amplified signal through said duplexer as said downlink radio signals.

9. A base station, for use in an area radio communication network comprising a plurality of terminal stations in a communication area of said base station, for establishing radio communication channels between first and second ones of said terminal stations through idle channels selected from a plurality of radio channels of a frequency division multiplex system in response to each call according to a demanded assign multiple access scheme, wherein:

said radio channels are divided into a plurality of channel groups, each of said plurality of channel groups comprising a predetermined number of neighboring channels of said radio channels; and said base station comprises means for designating each of said channel groups as said radio communication channels for different ones of said terminal stations, respectively.

10. A base station as claimed in claim 9, wherein said designating means designates as said radio communication channels the neighboring channels of first and second groups of said channel groups.

11. A base station as claimed in claim 9, wherein at least one of said terminal stations is a source station and at least one of said terminal stations is a destination stations, said channel groups comprises an uplink channel group which transmits uplink radio signals to said base station from said source stations with said first station being one of said source stations at a certain time and a downlink channel group which transmits downlink radio signals from said base station to destination stations with said station being one of said destination stations at said certain time, and said designating means comprises:

frequency division multiplex modem means for subjecting each of said channel groups to frequency division multiplex modem processing to demodulate said uplink radio signals en-bloc into uplink baseband signal and to modulate downlink baseband signals en-bloc into said downlink radio signals; and baseband switching means for switching said uplink baseband signals into said downlink baseband signals according to said demanded assign multiple access scheme.

12. A base station as claimed in claim 11, wherein said frequency division multiplex modem means comprises:

receiver means for receiving said uplink radio signals through a duplexer as reception radio signals;

low-noise amplifier means for low-noise amplifying said reception radio signals en-bloc into low-noise amplified signals;

demodulator means for frequency division multiplex demodulating said low-noise amplified signals en-bloc into said uplink baseband signals;

modulator means for frequency division multiplex modulating said downlink baseband signals en-bloc into said transmission radio signals;

high-power amplifier means for high-power amplifying said transmission signals en-bloc into high-power amplified signals; and transmitter means for transmitting said high-power amplified signals through said duplexer as said downlink radio signals.

13. A base station as claimed in claim 12, wherein:

said demodulator means comprises:
a demultiplexer for frequency division demultiplexing said low-noise amplified signals into uplink reception signals according to said uplink channels; and
individual demodulators for demodulating said uplink reception signals into said uplink baseband signals; and said modulator means comprises:
individual modulators for modulating said downlink baseband signals into downlink transmission signals according to said downlink channels; and
a multiplexer for frequency division multiplexing said downlink transmission signals en-bloc into said transmission radio signals.

14. A base station as claimed in claim 12, wherein:

said demodulator means comprises a transdemultiplexer for frequency division multiplex demodulating said low-noise amplified signals en-bloc into said uplink reception signals; and said modulator means comprises a transmultiplexer for frequency division multiplex modulating said downlink baseband signals en-bloc into said multiplexed transmission radio signals.

15. A base station, for use in an area radio communication network comprising a plurality of terminal stations in a communication area of said base station, for establishing radio communication channels between said terminal stations through idle channels selected from a plurality of radio channels of a frequency division multiplex system in response to each call according to a demand assign multiplex access scheme, wherein:

said radio channels are divided into first through M-th channel groups, each of said first through M-th channel groups comprising a predetermined number of neighboring channels of said radio channels, where M represents a predetermined integer; and said base station comprises first through M-th channel group unit means for designating said first to said M-th channel groups, respectively, as said radio communication channels for different ones of said terminal stations, respectively.

16. A base station as claimed in claim 15, wherein said terminal stations are grouped into first through M-th station groups in correspondence to said first though said M-th channels groups, and said first through said M-th channel group unit means designate said radio communication channels for communication from and to the terminal stations of said first through said M-th station groups, respectively, through corresponding ones of said first through said M-th channel groups.

17. A base station as claimed in claim 15, wherein at least one of said terminal stations is a source station and at least one of said terminal stations is a destination station; and said first through said M-th channel group unit means comprise:

receiver means for receiving uplink radio signals through said first to said M-th channel groups from said source stations;

transmitter means for transmitting downlink radio signals through said first to said M-th channel groups to said destination stations;

demodulator means for frequency division multiplex demodulating said uplink radio signals en-bloc into uplink baseband signals;

modulator means for frequency division multiplex modulating downlink baseband signals en-bloc into said downlink radio signals; and baseband switching means for switching said uplink baseband signals into said downlink baseband signals according to said demanded assign multiple access scheme and said destination stations.

18. A base station as claimed in claim 17, wherein:

said demodulator means comprises a transdemultiplexer for frequency division multiplexing said uplink radio signals en-bloc into said uplink baseband signals; and said modulator means comprises a transmodulator for frequency division multiplex modulating said downlink baseband signals en-bloc into said downlink radio signals.

19. A base station as claimed in claim 17, further comprising:

link modulator means for frequency division multiplex modulating said uplink baseband signals en-bloc into downward radio frequency signals; and link demodulator means for frequency division multiplex demodulating upward radio frequency signals en-bloc into said downlink baseband signals.

20. A terminal station used as a first terminal station in addition to a plurality of other terminal stations in an area radio communication network which comprises a base station having a communication area and said first station having a communication area and said first station and said other terminal stations in said communication area and which establishes radio communication channels via said base station between said first station and a second of said other terminal stations through idle channels selected from a plurality of radio channels of a frequency division multiplex system in response to each call according to a demanded assign multiple access scheme, wherein:

said radio channels are divided into a plurality of channel groups, each of said plurality of channel groups comprising a predetermined number of neighboring channels of said radio channels; and each of said first terminal station and said other terminal stations comprises means for designating a different one of said channel groups as its said radio communication channels, respectively.

21. A terminal station as claimed in claim 20, wherein said designating means designates as said radio communication channels the neighboring channels of first and second channel groups.

22. A terminal station as claimed in claim 20, wherein said each terminal station has at least one communication terminal, said channel groups comprises an uplink channel group transmitting uplink radio signals to said base station from said each terminal station and a downlink channel group transmitting downlink radio signals from said base station to said each terminal station, and wherein said designating means comprises:

frequency division multiplex modem means for subjecting each of said channel groups to frequency division multiplex modem processing to demodulate said downlink radio signals en-bloc into downlink baseband signals and to modulate uplink baseband signals of said uplink channel group en-bloc into said uplink radio signals; and baseband processing means for processing said downlink baseband signals into downlink communication signals for delivery to said communication terminals and for processing into said uplink baseband signals a plurality of uplink communication signals originating at said communication terminals.

23. A terminal station as claimed in claim 22, wherein said frequency division multiplex modem means comprises:

receiver means for receiving said downlink radio signals through a duplexer as reception radio signals;

low-noise amplifier means for low-noise amplifying said reception radio signals en-bloc into low-noise amplified signals;

demodulator means for frequency division multiplex demodulating said low-noise amplified signals en-bloc into said downlink baseband signals;

modulator means for frequency division multiplex modulating said uplink baseband signals en-bloc into frequency division multiplexed transmission signals;

high-power amplifier means for high-power amplifying said transmission signals en-bloc into high-power amplified signals; and transmitter means for transmitting said high-power amplified signals through said duplexer as said uplink radio signals.

24. A terminal station as claimed in claim 23, wherein:

said demodulator means comprises a transdemultiplexer for frequency division multiplex demodulating said low-noise amplified signals into said downlink baseband signals; and said modulator means comprises a transmultiplexer for frequency division multiplex modulating said uplink baseband signals into said frequency division multiplexed transmission signals.

25. A terminal station as claimed in claim 23, wherein said baseband processing means comprises a plurality of baseband processors between said frequency division multiplex modem means and said communication terminals, said baseband processor processing:

the downlink baseband signals of said downlink channel group into said downlink communication signals in accordance with the neighboring channels of said downlink channel groups; and said uplink communication signals into said uplink baseband signals in accordance with the neighboring channels of said uplink channel group.

* * * * *